United States Patent [19]

Chen et al.

[11] Patent Number: 5,011,108
[45] Date of Patent: Apr. 30, 1991

[54] ACTIVE MOUNTS

[75] Inventors: Hsiang M. Chen, Latham; Paul Lewis, Scotia; Donald S. Wilson, Clifton Park, all of N.Y.

[73] Assignee: Mechanical Technology Incorporated, Latham, N.Y.

[21] Appl. No.: 392,197

[22] Filed: Aug. 10, 1989

[51] Int. Cl.$^5$ .............................................. F16M 13/00
[52] U.S. Cl. .................................... 248/550; 248/636; 248/638
[58] Field of Search ...................... 248/638, 636, 550; 188/1.11, 378, 379, 380; 267/136; 52/167

[56] References Cited

U.S. PATENT DOCUMENTS

| | | | |
|---|---|---|---|
| 3,088,062 | 4/1963 | Hudimac | 248/550 X |
| 3,464,657 | 9/1969 | Bullard | 248/550 |
| 4,033,541 | 7/1977 | Malueg | 248/550 |
| 4,352,481 | 10/1982 | Forward | 248/550 |
| 4,615,504 | 10/1986 | Sandercock | 248/638 X |
| 4,624,435 | 11/1986 | Freudenberg | 248/550 |
| 4,635,892 | 1/1987 | Baker | 52/167 X |
| 4,795,123 | 1/1989 | Forward | 188/378 X |
| 4,796,873 | 1/1989 | Schubert | 267/136 |
| 4,821,205 | 4/1989 | Schutten | 248/550 X |
| 4,869,474 | 9/1989 | Best | 267/136 |

Primary Examiner—J. Franklin Foss
Attorney, Agent, or Firm—Kane, Dalsimer, Sullivan, Kurucz, Levy, Eisele and Richard

[57] ABSTRACT

The present invention relates to an active mount system in which a vibration sensor such as a force gauge or an accelerometer senses vibrational forces transmitted through a resilient mount by a load such as a machine. The invention further includes a control signalling device that processes and transmits the sensed signal to a force transducer such as an electromagnet which supplies an attenuating force to the resilient mount in response to the signal.

17 Claims, 2 Drawing Sheets 5,011,108

ACTIVE MOUNTS

BACKGROUND OF THE INVENTION

The present invention relates to active mounts which are introduced between a machine and foundation or other supporting structure. In particular the present invention relates to active mounts for sensing and attenuating vibrational forces transmitted by dynamic loads from a machine, such as a motor, through a resilient mount such as by elastomers or springs. Various type of equipment utilizing soft mounts are known which perform two functions:

1. Isolate the forces generated by the equipment from the foundation and surroundings; and
2. Isolate external forces and disturbances from the equipment.

This is most usually accomplished by the use of soft mounts. The low mount stiffness ensures that the equipment/base/mount combination has a low natural frequency. Disturbances at frequencies above the natural frequency are attenuated to accomplish both of the above functions.

Usually, rubber is the most generally used material. Cross-sectional areas are dictated by rubber bearing stress limits. Area and the modulus of rubber result in a practical allowable size which limits how low the mount stiffness can be. In short, while dynamic force transmission levels can be reduced, some force will still be transmitted. Further force reduction is not possible with a purely passive system.

Accordingly, it would be advantageous to develop a mount which avoids the drawbacks associated with the aforementioned prior art proposals.

SUMMARY OF THE INVENTION

The present invention provides for an active mount system which generates forces which act to greatly reduce the transmitted forces. The active mount system includes a resilient mount preferably formed of a structure of a rubber or similar material for supporting the load in compression; a force transducer arranged in parallel with the resilient mount, and associated signal control circuitry. The force transducing means for the active mount system can be an electromagnet, however, other means such as piezo-electric devices, magnetorestrictive devices, etc. could be utilized. The signal control circuitry acts to alter the stiffness and damping characteristics of the mount system to achieve additional force attenuation gains.

DESCRIPTION OF THE DRAWINGS

For a fuller understanding of the nature and objects of the invention, reference should be had to the following detailed description, taken in connection with the accompanying drawings, in which.

DETAILED DESCRIPTION OF THE PREFERRED EMBODIMENT

Figure 1:
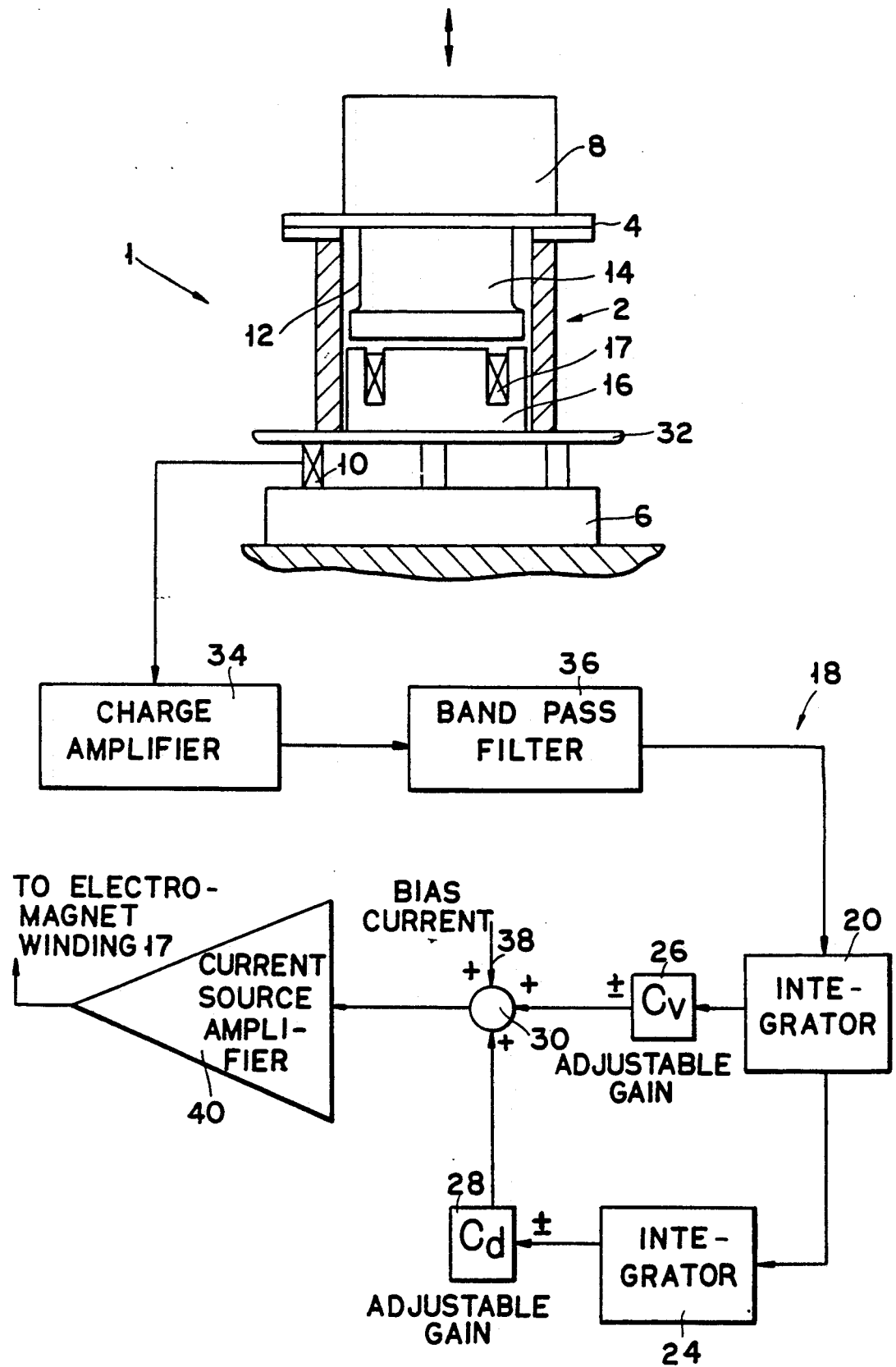
FIG. 1 is a schematic drawing of an active mount system in accordance with the teachings of the present invention.

Referring now to FIG. 1 in which is shown an active mount system 1 comprising a resilient mount 2, preferably formed of rubber or similar material. Resilient mount 2 is disposed between a machine mounting plate 4 and the foundation or other supporting structure 6 for the system and a machine 8 secured to the mounting plate 4. The system also includes a vibration sensor device 10 such as a force gauge, a velocity probe, or an accelerometer, and an electromagnet 12 including a laminated armature 14 and a laminated stator 16 carrying winding 17. Electromagnet 12 provides the force transducer means for the active mount system 1. The system further includes control signalling means shown generally at 18, which may be a digital controller.

As shown in FIG. 1, the control signalling means 18 comprises first and second integrator circuits 20 and 24, respectively, and their respective associated adjustable gain circuit elements 26 and 28, and a summer 30.

The active mount system shown in FIG. 1 includes force gauge 10 which is mounted on one end of a table 32 between the mount and the support structure 6. The output of force gauge 10, which represents the transmitted vibrational forces is applied to the input of a charge amplifier 34, the output of which is fed to a band pass filter 36 which passes only the disturbing frequencies. The output of band pass filter 36 is applied to the first integrator circuit 20 which integrates the signal and outputs a velocity signal which is proportional to damping to both second integrator circuit 24 and to adjustable gain circuit element 26. The second integrator circuit 24 integrates the velocity signal received from integrator 20 and outputs a displacement signal to the adjustable circuit element 28 which is proportional to stiffness. The velocity signal from gain circuit element 26 and the displacement signal from gain circuit element 28 are fed to the summer 30. A bias current 38 is also applied to the summer 30 in order to preload the electromagnet 12. The output of summer 30 is applied to the input of a suitable current source amplifier 40, the output of which is applied to the winding 17 of electromagnet 12 causing the electromagnet 12 to provide an attenuating force in response to the vibrational forces sensed by the force gauge 10. The force produced by electromagnet 12 acts to change the stiffness and damping characteristics of the resilient mount 2. Thus, the active mount 1 has a feedback control system to attenuate the dynamic forces transmitted by the machine 8 through the resilient mount 2 supporting mounting plate 4 on top of which the machine 8 is secured. The resilient mount 2 is supported on top of a table 32 which does not separate due to the weight it supports.

The present invention operates as follows: when the machine 8 transmits a dynamic force through resilient mount 2 to the table 32, the magnitude of that force is sensed by the force gauge 10 which measures the transmitted vibrational force. The sensed acceleration signal is then processed, as described above including integrating the signal twice to obtain both the velocity signal which is proportional to damping and the displacement signal which is proportional to stiffness. It is understood that the sensor can be any kind of vibration sensing means such as a displacement sensor or a velocity sensor and the appropriate control circuitry would be employed in conjunction with the preferred sensor. For example, if a velocity sensor is employed it would not be necessary to employ the first integrator 20.

Figure 2:
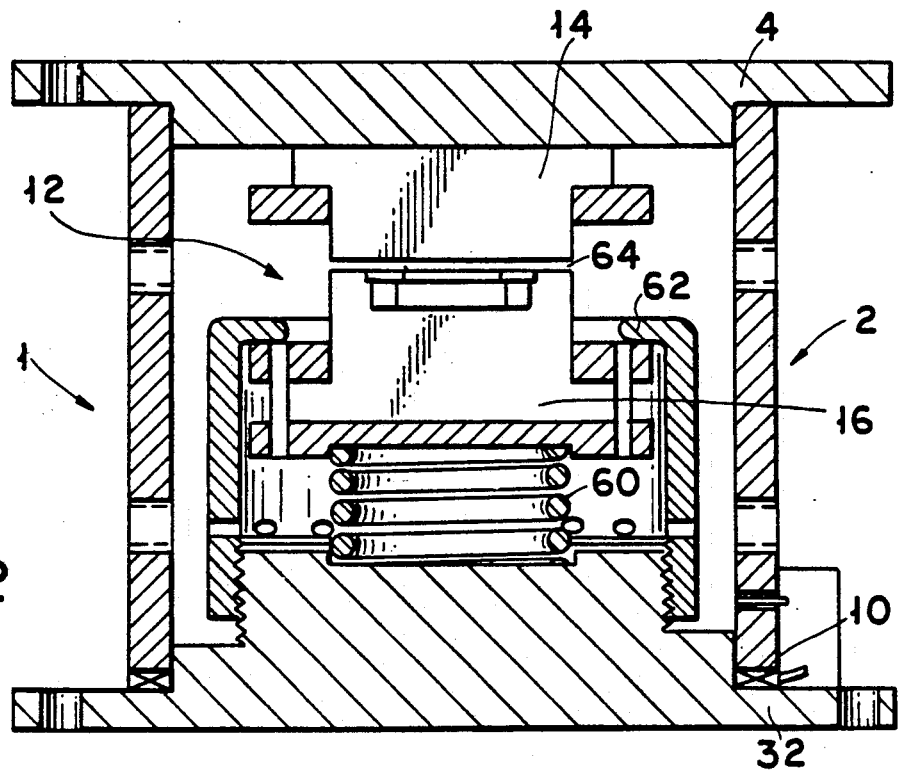
FIG. 2 is a partial schematic drawing of an active mount system in accordance with another embodiment of the present invention incorporating means to prevent damage to the system under high shock load conditions.

FIG. 2 illustrates another embodiment of the invention which includes means to prevent damage to the transducer means under high shock load conditions. The various components of the system shown in FIG. 2 which correspond to those of FIG. 1 are represented by the same reference numerals. Also, since the control circuitry arrangement is the same as in FIG. 1, such control circuitry is not illustrated in FIG. 2.

As shown in FIG. 2 the active mount system comprises a resilient mount 2, a sensor device 10, an electromagnet 12 including an armature 14 and a stator 16. The electromagnet 12 provides the force transducer means for the active mount system as described in connection with FIG. 1.

The system shown in FIG. 2 also includes a spring means 60 disposed between the stator 16 and the table 32 to provide a means for preventing damage to the electromagnet 12 under high shock load conditions.

In normal operation the stator 16 is preloaded by the spring 60 and held against the casing 62. During abnormal or a shock load situation when the armature 14 moves more than the distance of air gap 64, the spring 60 rapidly deflects to allow stator 16 to retreat and thus avoid damage to the electromagnet 12.

Figure 3:
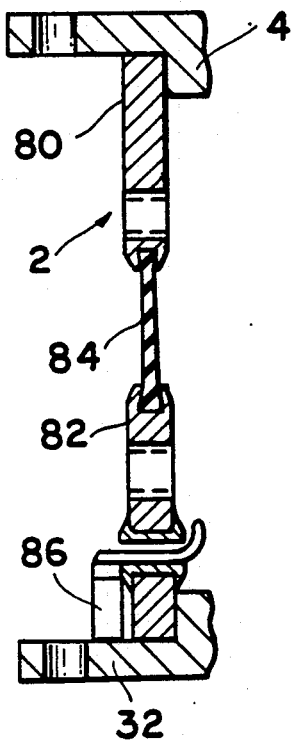
FIG. 3 is a sectional view of an arrangement providing for a relatively soft resilient mount.

FIG. 3 illustrates another embodiment of the invention wherein the resilient mount 2 is made relatively soft. As shown, the soft resilient mount 2 comprises an upper rigid Section 80, a lower rigid Section 82, and an intermediate Section 84 made of a relatively soft elastomeric material. The upper rigid Section 80 is disposed adjacent the machine mounting plate 4 and the lower rigid Section 82 is disposed adjacent the table 32, with the intermediate soft elastomeric Section 84 arranged between Sections 80 and 82 to complete the resilient mount between the machine mounting plate 4 and the foundation or other supporting structure.

The system also includes a sensor device which measures the forces transmitted through the resilient mount 2. Since the resilient mount is relatively soft, it is preferred that the sensor device be an accelerometer mounted to either the machine mounting plate 4 or to the table 32. As shown in FIG. 3 the accelerometer 86 is mounted to the table 32. The output of the accelerometer is applied to the control circuitry as previously described in connection with FIG. 1.

Obviously, numerous modifications may be made to the invention without departing from its scope as defined in the appended claims.

We claim:

1. An active mount system comprising:
a relatively low stiffness resilient mount for supporting a load in compression from a machine supporting base to a supporting structure;
sensing means for sensing a level of vibrational force transmitted from said load through said resilient mount;
control signalling means for transmitting a signal in response to the level of vibrational force sensed by said sensing means; and
force transducing means for providing a force to attenuate said vibrational force transmitted through said resilient mount in response to said signal from said control signalling means;
wherein said force transducing means includes an electromagnetic device in parallel with said resilient mount, and means for providing a D.C. bias current to preload the electromagnetic device;
wherein said sensing means includes means for determining displacement and velocity of the load; and
wherein said force transducing means, in response to said means for determining displacement and velocity of the load, provides a force to change stiffness and damping characteristics, respectively, of said resilient mount.

2. An active mount system according to claim 1 wherein said force transducing means is an electromagnetic device in parallel with said resilient mount.

3. An active mount according to claim 1 wherein said resilient means is formed of an elastomeric material.

4. An active mount system of claim 3 wherein said elastomeric material is rubber.

5. An active mount system according to claim 1 wherein said force transducer means is a piezoelectric device.

6. An active mount system according to claim 1 wherein said force transducer means is a magnetorestrictive device.

7. An active mount system according to claim 1 wherein said sensing means is a force gauge.

8. An active mount system according to claim 1 wherein said digital sensing means is an accelerometer.

9. An active mount system according to claim 1 wherein said control means includes an analog or a digital control circuit.

10. An active mount system according to claim 9 wherein said analog or digital control circuit includes integrators adapted to receive and to integrate a signal output from said sensing means and gain circuit elements for conditioning the integrator circuitry output.

11. An active mount system accordingly to claim 10 further comprising a current source amplifier adapted to receive said output from said integrators and to output a signal to said force transducing means.

12. An active mount system according to claim 11 further comprising a summer circuit and a current source amplifier wherein each of said integrators is connected to a respective gain circuit element, the outputs of each such gain circuit element is input to said summer circuit, and said summer circuit transmitting said signal into said current source amplifier.

13. An active mount system according to claim 1 including spring means disposed adjacent said force transducing means and arranged and constructed to allow for movement of said force transducing means when said mount is subject to high shock load.

14. An active mount system according to claim 1 wherein said force transducing means is an electromagnetic device having an armature and a stator and further including a spring means disposed adjacent said stator to allow for movement of said stator when said mount is subjected to a high shock load.

15. An active mount system according to claim 13 wherein said sensing means for sensing the level of force transmitted through said resilient mount is an accelerometer.

16. An active mount system according to claim 14 wherein said sensing means for sensing the level of forces transmitted through said resilient mount is an accelerometer.

17. An active mount system according to claim 16 wherein said sensing means for sensing the level of forces transmitted through said resilient mount is a force gauge.

* * * * *